Jan. 15, 1952 R. A. SALATHIEL 2,582,459
COMPOSITION FOR OIL WELL CEMENTING
Filed Nov. 3, 1948 7 Sheets-Sheet 2

FIG. 2.

Richard A. Salathiel, INVENTOR.
BY
AGENT.

FIG. 3.

Jan. 15, 1952  R. A. SALATHIEL  2,582,459
COMPOSITION FOR OIL WELL CEMENTING
Filed Nov. 3, 1948  7 Sheets-Sheet 4

FIG. 4.

Richard A. Salathiel, INVENTOR.
BY

Jan. 15, 1952  R. A. SALATHIEL  2,582,459
COMPOSITION FOR OIL WELL CEMENTING

Filed Nov. 3, 1948  7 Sheets—Sheet 5

FIG. 5.

Richard A. Salathiel, INVENTOR.

BY

AGENT.

Jan. 15, 1952     R. A. SALATHIEL     2,582,459
COMPOSITION FOR OIL WELL CEMENTING
Filed Nov. 3, 1948     7 Sheets-Sheet 6

FIG. 6.

Jan. 15, 1952     R. A. SALATHIEL     2,582,459
COMPOSITION FOR OIL WELL CEMENTING

Filed Nov. 3, 1948     7 Sheets-Sheet 7

BARREL IV TEST A
HIGH EARLY STRENGTH CEMENT (6.2 GAL. PER. SACK-SLURRY)
TENSILE STRENGTH = 378 LBS. PER SQ. IN.

BARREL VI TEST A
IMPROVED CEMENT CONTAINING 15 LBS. WYOMING BENTONITE AND 0.5 LB. CALCIUM LIGNOSULFONATE PER SACK OF CEMENT.
(10 GAL. PER SACK SLURRY)
TENSILE STRENGTH = 211 LBS. PER SQ. IN

BARREL I TEST B
SLOW SET CEMENT (4.5 GAL. PER SACK SLURRY.)
TENSILE STRENGTH = 416 LBS. PER SQ. IN.

GUN PERFORATING TESTS
3 1/16" GUN, 15/32" BULLET, 55-GRAIN POWDER CHARGE

FIG. 7.

Richard A. Salathiel, INVENTOR.
BY
AGENT.

Patented Jan. 15, 1952

2,582,459

UNITED STATES PATENT OFFICE 2,582,459

COMPOSITION FOR OIL WELL CEMENTING

Richard A. Salathiel, Houston, Tex., assignor, by mesne assignments, to Standard Oil Development Company, Elizabeth, N. J., a corporation of Delaware Application November 3, 1948, Serial No. 58,127

6 Claims. (Cl. 106—90)

The present invention is directed to an improved composition for oil well cementing. More particularly, the invention is directed to a composition comprising a cement slurry suitable for use in cementing wells which remains fluid for a sufficient length of time to enable it to be pumped into subsurface formations.

Prior to the present invention, it has been known to add various components to cement used in cementing wells drilled in the earth's formation, particularly in cementing oil wells prior to bringing the wells into production. It has been customary to cement the casing at the desired point and then to penetrate the cement by employing perforating bullets. The conventional cements employed in such service are the slow-setting hydraulic cements which have many undesirable features. In the first place, the cements employed heretofore have high mechanical strength and tend to shatter when subjected to mechanical shock. Also, slurries of such cements, if sufficiently concentrated to avoid excessive settling, have high viscosities which make it difficult to place them at the desired point against the subsurface formation. The conventional cements also tend to approach their ultimate strength gradually, which is detrimental in some cases.

It has been known to add bentonitic clays in small amounts to cements to impart to their slurries such characteristics as increased viscosity, increased angle of repose, decreased settling, enhanced mechanical strength, and quickened setting of the cement. It has also been known to add various addition agents such as aromatic sulfonic acids and soluble salts of lignin sulfonic acid to concrete and hydraulic cements to increase workability or plasticity of the cement in the wet state. The amounts of these materials added have been small and the cements to which they have been added have had commercially acceptable compressive strengths. Thus, the prior art teachings have been to the effect to employ cements consisting of aggregates, bentonitic clays, and dispersing agents such as the salts of the aromatic sulfonic acids and the lignin sulfonic acids in very small amounts in conventional concrete used for building and pouring purposes. The quantities of these materials conventionally used have been such as to leave the strength of the resulting concrete substantially unimpaired.

The cements employed by the prior art, therefore, that include the aforementioned addition agents are largely unsuitable in cementing oil wells, since desirable features of a cement for use in oil wells are absence of aggregates and low mechanical strength that will prevent shattering under sudden impact such as that resulting from perforating the cement with bullets to bring the oil well into production. Cements used in oil wells should also have the property of being perforated readily.

It is, therefore, the main object of the present invention to provide an improved cement which has a low mechanical strength and which will not shatter under high impact.

Another object of the present invention is to provide a slow-setting cement slurry which has improved pumpability.

Another object is to provide a cement slurry which will not lose water and bleed after it has reached the formations into which it is introduced.

The objects of the present invention may be achieved by providing a cement composition including cement, a colloidal clay, a soluble salt of a sulfonic acid, and water to which may be added suitable additives of the type of carbonates, hexametaphosphates, and bicarbonates.

Briefly then, the invention may be described as involving an improved composition comprising cement of high early strength, a colloidal clay, a soluble salt of a sulfonic acid, such as an aromatic sulfonic acid of selected type or a lignin sulfonic acid, each in carefully controlled amounts, and water sufficient to make the necessary slurry to cause the cement to set up properly.

In practicing the present invention, the cement component of the improved composition usually will comprise between 40 and 70% by weight of the mixture. The cement employed will usually be a high early strength hydraulic cement of the grade supplied on the market. The colloidal clay will be employed in an amount no less than 5% by weight of the dry cement and no more than about 35% by weight. Suitable clays are those such as Wyoming bentonite clays, El Paso surface clay, and those including the montmorillonites and particularly the sodium montmorillonites. However, the calcium montmorillonites may be employed and suitably other salts of the montmorillonites may be used, but the sodium montmorillonites such as those encountered in Wyoming bentonite is the preferred type of clay.

The salt of the sulfonic acid may be a salt of an aromatic sulfonic acid such as those employed by Tucker in U. S. 2,141,569, or those disclosed in the patent to Mark, U. S. 2,141,570. These compounds may be termed salts of sulfonic acids having a plurality of aromatic nuclei. The salts of the sulfonic acid, either aromatic or lignin sulfonic acid, should be in the form of their water soluble salts and may be used in the composition in an amount in the range between 0.1 and 1% by weight of the dry cement. The remainder of the composition may be water or other aqueous solutions to which may be added sodium hexametaphosphate, sodium bicarbonate, or sodium hydroxide in an amount between 0.1 and 1% of the total composition including water.

In preparing the improved composition of my invention, it may be preferred in certain cases to mix the colloidal clay with the water before adding the cement, because mixing the clay with the water before the cement and the other ingredients of the composition are added makes it possible to use less clay than when the clay is added to the water and cement. For example, in some instances as little as one-half as much clay will be required if it is well hydrated before the cement is added. However, for convenience in handling of materials at the drilling location, it will usually be advantageous to have the cement, clay, and dispersing agent dry-mixed together before bringing them to the well for mixing with water. As a general rule, it may be stated that the water-to-cement ratio to be used in my improved cement will ordinarily be selected on the basis of the desired strength of the set cement or the density of the cement slurry which is desired within the ranges given.

The invention will be further illustrated by reference to the following example in which a composition was made up as follows:

| Substance Added to Slurry | Per Cent by Weight of Final Slurry |
|---|---|
| High Early Strength Portland Cement | 50.6 |
| Wyoming Bentonite Clay | 6.08 |
| Soluble Calcium Lignosulfonate | 0.15 |
| Sodium Hexametaphosphate | 0.056 |
| Water | 43.3 |

The solid materials given in the foregoing table were mixed dry and water was then added to make a slurry. The slurry was then tested and found to have the following characteristics:

| Observation Made | Value Observed |
|---|---|
| Apparent Viscosity on Halliburton Consistometer (36 R. P. M.). | 2 Poises. |
| Halliburton Consistency after 3 Hrs. and 22 Min. at 175° F. | 16 Poises. |
| Pumpability Time to 50 Poises at 175° F. on the Halliburton Consistometer. | 3 Hrs. 42 Min. |
| Set Times Vicat Needle at 175° F.: | |
| Initial | 3 Hrs. 57 Min. |
| Final | 5 Hrs. 57 Min. |
| Tensile Strength of Briquettes Cured for 72 Hrs. at 175° F. | 170 p. s. i. |

Figure 1:
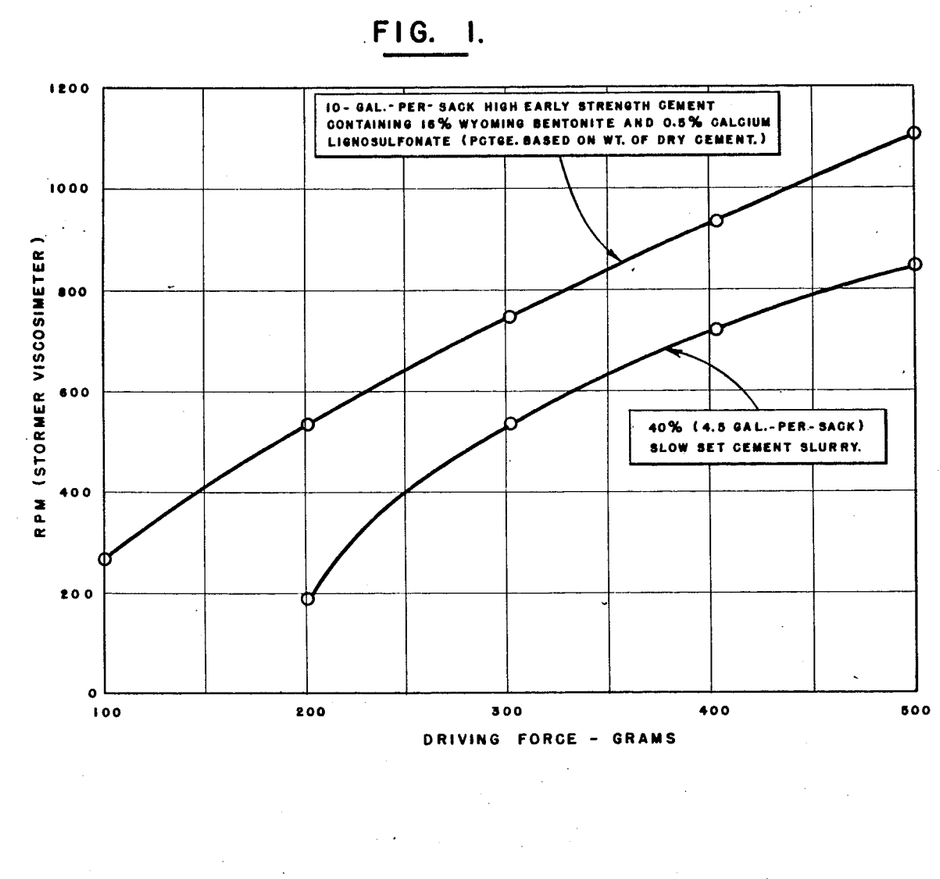

In order to illustrate the invention further, a composition was made up in accordance with the present invention including 10 gallons of water, 94 pounds of high early strength Portland cement to which had been added, on a dry basis, 16% by weight of Wyoming bentonite and 0.5% by weight of soluble calcium lignosulfonate. This composition was tested to determine its fluidity at different rates of shear in the Stormer viscosimeter and was compared with the rates of shear in the Stormer viscosimeter of a 40% (4.5 gallons of water for 94 pounds of cement) slow setting Portland cement slurry. The results of these tests are presented in Fig. 1, which is a graph showing the revolutions per minute on the Stormer viscosimeter plotted against the driving force in grams and illustrates the comparable fluidity of the improved composition of the present invention with conventional cements. It will be seen that the improved cement slurry was more fluid at all rates of shear than was the conventional cement slurry, with the difference being greatest at the lower rates of shear.

The cement slurries made up in accordance with this example were then allowed to set in stoppered test tubes for 24 hours. After this period of setting, the samples were examined and no water was observed above the improved composition after setting, while 3% by volume of water had separated from the conventional cement slurry. These results indicate that the improved slurry had improved characteristics over conventional slurries. It is to be understood that, if higher percentages of water had been employed in the conventional slurry, a larger amount of water would have been separated.

Another composition in accordance with the present invention was prepared as follows: 10 gallons of water and 94 pounds of high early strength Portland cement containing 16% Wyoming bentonite clay and 0.5% of soluble lignin sulfonate, on the dry basis of the cement, were intimately admixed. A portion of the resulting cement slurry was then tested by applying a pressure of 50 pounds per square inch to the cement slurry over a filter bed area of 7 square inches. Only about 60 milliliters of filtrate separated from the improved composition of the present invention while under comparable conditions of pressure and time with a conventional slurry of 4.5 gallons of water per 94 pounds of slow setting Portland cement without additives, 150 milliliters of filtrate flowed from the conventional slurry. These data show the improved filtration characteristics of the composition of my invention.

Figure 2:
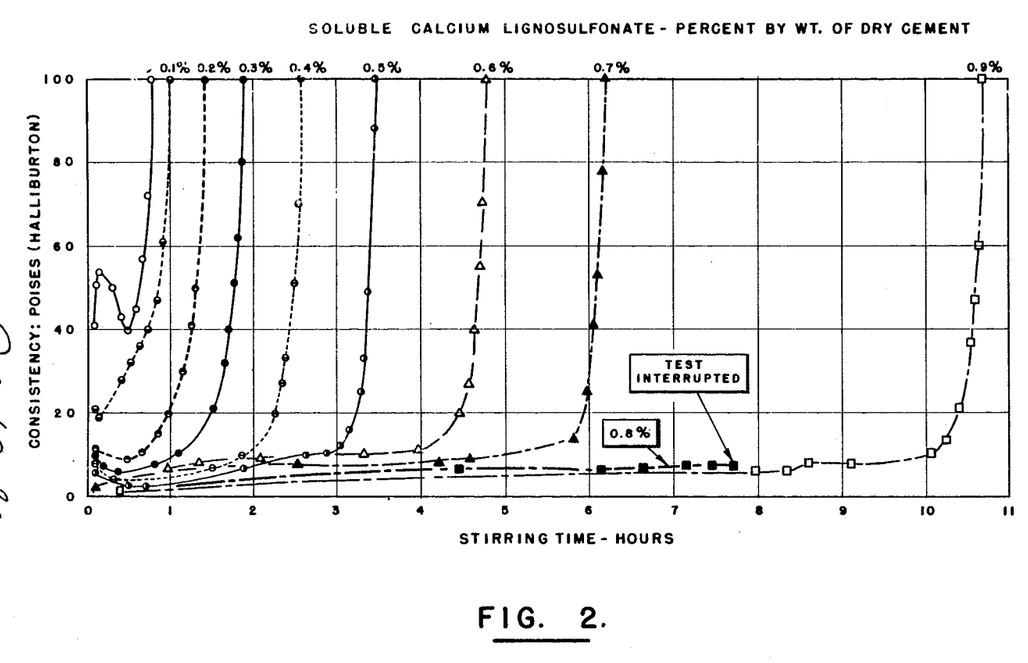

A cement slurry made up from high early strength Portland cement containing 10 gallons of water per 94 pounds of cement and 14% by weight of bentonite, based on the dry cement, was prepared. One portion of this slurry was tested as prepared and to other separate portions soluble calcium lignosulfonate was added in amounts ranging from 0.1% by weight, on a dry basis, of the cement to 0.9% by weight, making a total of nine different slurries. These nine slurries were then tested in the Halliburton consistometer at a bath temperature of 175° F. The results of these tests are presented in Fig. 2 in which the consistency in poises is plotted against stirring time in hours for the slurries containing varying amounts of the soluble calcium lignosulfonate. It will be seen from an examination of Fig. 2 that the slurry without the soluble calcium lignosulfonate had an initial consistency of 40 poises which increased to about 55 after about 15 minutes of stirring, dropped back to 40 after one-half hour stirring, and from thence rose rapidly after 45 minutes to about 100 poises. The addition of 0.1% by weight of soluble calcium lignosulfonate decreased the initial consistency of 40 poises to about 20. After about 45 minutes the consistency had risen to about 40 and after 1 hour of stirring to 100 poises. The data further show that amounts ranging from 0.2 to 0.9% of the soluble calcium lignosulfonates reduced the consistency to an even greater degree, to values in the neighborhood of 10 poises and less. In all cases excepting that of the slurry containing 0.1% by weight of soluble calcium lignosulfonate, the consistency was 20 poises or less after one hour's stirring and in the case of those slurries containing 0.5% and more of the soluble calcium lignosulfonate, the consistency remained below 20 poises after long stirring times in excess of 3 hours. These data show the effect of the concentration of soluble calcium lignosulfonate on the consistency and thickening time of my improved composition.

Figure 3:
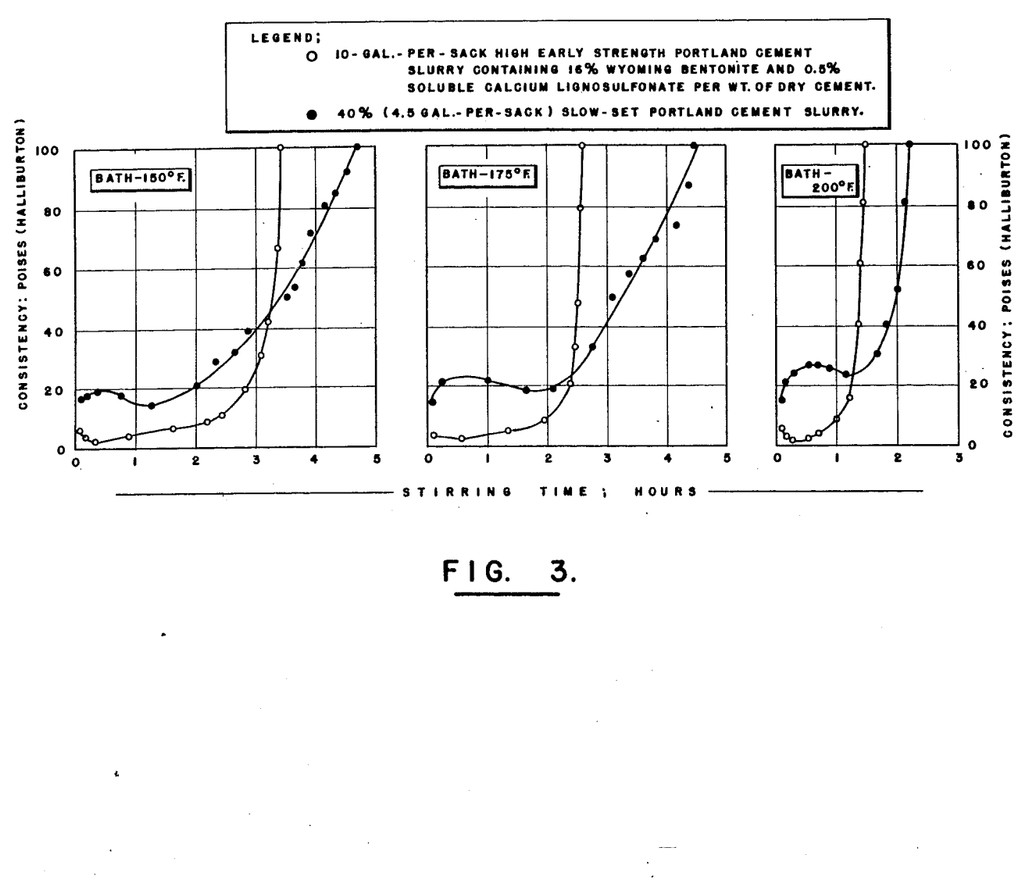

In order to obtain the effect of temperature and time on the thickening of an improved composition in accordance with my invention, a composition was made up containing 10 gallons of water per 94 pounds of high early strength Portland cement to which was added, respectively, 16% and 0.5% of Wyoming bentonite clay and soluble calcium lignosulfonate by weight of dry cement. A 40% slurry (4.5 gallons of water per 94 pounds) of slow setting Portland cement was made up for comparative purposes and tests on the two slurries were made on the Halliburton consistometer at bath temperatures of 150° F., 175° F. and 200° F. The results of these tests are shown in Fig. 3. It will become apparent from an examination of Fig. 3, in which the consistency in poises is plotted against time of stirring, that the improved composition remained fluid for a considerable length of time, which permits an adequate time for pumping into the subsurface formation, and thereafter set rapidly. It is also apparent from an examination of the data that the viscosity of the conventional slurry was much higher than that of the improved composition throughout the pumpability time; thereafter its rate of setting was much slower than that of my improved composition.

Figure 4:
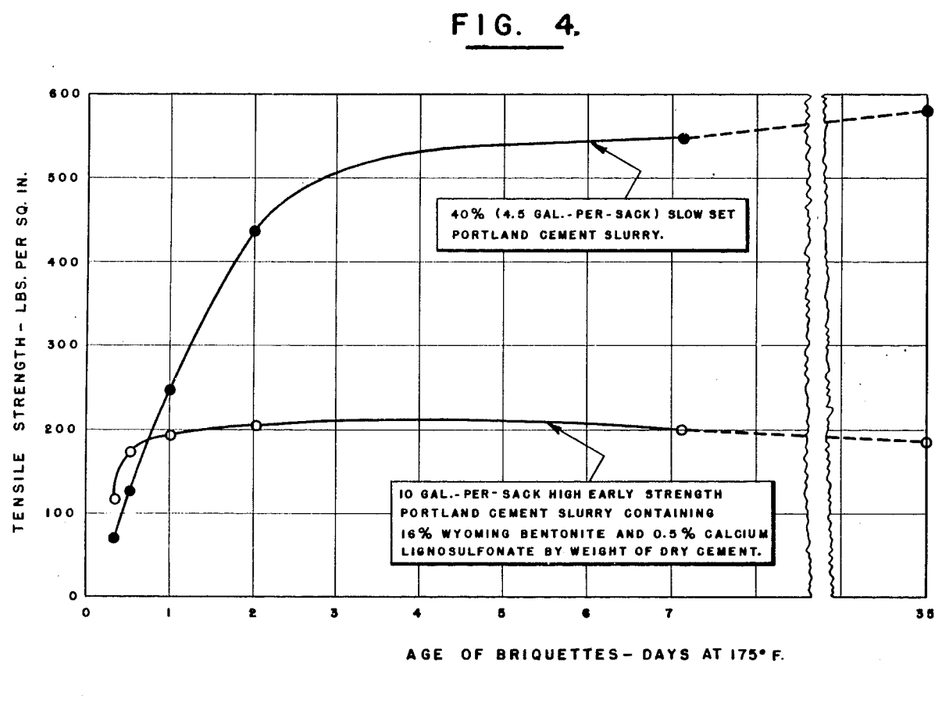

In order to illustrate the strength of the improved composition of the present invention, a composition similar to that described in the preceding example was formed into briquettes and allowed to set. A composition of the present invention comprised a slurry of 10 gallons of water per 94 pounds of Portland cement to which was added 16% Wyoming bentonite and 0.5% by weight of calcium lignosulfonate based on the dry cement. The other slurry was the 40% slurry (4.5 gallons of water per 94 pounds) of slow setting Portland cement. Briquettes were made up and were tested for tensile strength after ⅓, ½, 1, 2, 7, and 35 days' aging at 175° F. It will be seen from an examination of the data shown in Fig. 4 that the briquettes made up from compositions in accordance with the present invention reached a tensile strength of about 200 pounds per square inch after 1 day and the tensile strength remained in the neighborhood of 200 pounds until after 7 days' age and thereafter fell off slightly to about 185 pounds after 35 days' age, whereas the conventional cement slurry reached a tensile strength after 1 day's aging of approximately 240 pounds; the tensile strength rose rapidly to 440 pounds after 2 days and thereafter rose to the neighborhood of 540 pounds after 7 days and continued to rise to about 575 pounds tensile strength after 35 days' aging. It will be apparent that the ultimate strength of the cement is much more quickly reached by the improved composition of the present invention than by the conventional slow setting composition. The data also abundantly demonstrate that the compositions of the present invention have lower ultimate strengths than those of conventional compositions. This feature is desirable in oil well cements because it allows the bullets employed in perforation to penetrate the cement without shattering it.

Figure 5:
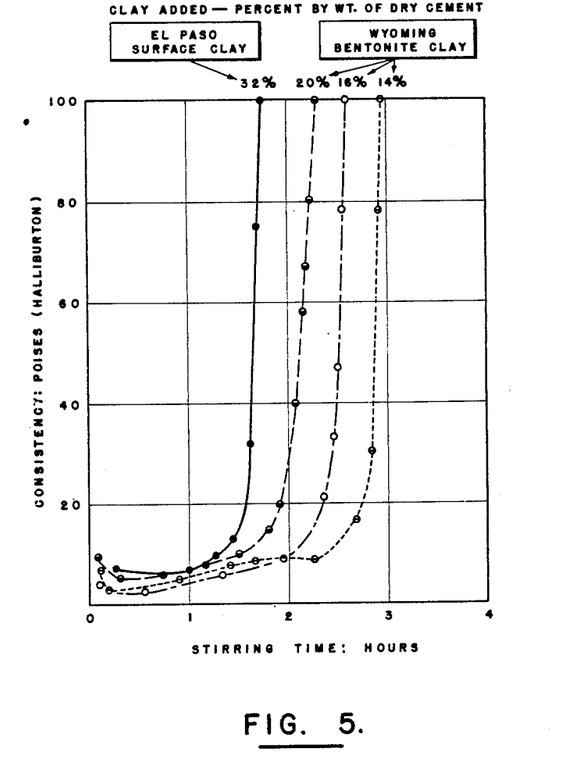

A series of four compositions was prepared containing varying amounts of different clays. In each case the clay and soluble calcium lignosulfonate were mixed with the dry cement before adding water. Each composition included 10 gallons of water per 94 pounds of high early strength Portland cement and 0.5% of soluble calcium lignosulfonate by weight of dry cement. One composition contained 32% by weight, on the dry basis of the cement, of El Paso clay while the other compositions contained, respectively, 20%, 16%, and 14% by weight of Wyoming bentonite clay. The four compositions containing varying amounts of clay were then tested by the Halliburton consistometer at a bath temperature of 175° F. The data obtained are plotted in the attached Fig. 5 in which consistency in poises is plotted against stirring time. These data show the effect of the amount and kind of clay used in the compositions of my invention. The Wyoming bentonite clay is preponderately a highly colloidal, sodium-montmorillonite clay, whereas the El Paso surface clay contains considerably less colloidal material.

In order to illustrate further the desirable characteristics of the composition of the present invention, gun perforating test-setups were prepared by centering 5½-inch, 15-pound casing inside an 8⅝-inch, 20-gauge sheet metal cylinder, which in turn was centered inside a 55-gallon capacity steel barrel. The entire volume, excluding the inside of the 5½-inch casing, was filled with cement slurry. Similar set-ups were prepared with different slurries which were mixed as follows: 4.5 gallons of water per 94 pounds of a slow set cement; 6.2 gallons per 94 pounds of high early strength cement; and 10 gallons per 94 pounds of a high early strength cement made up in accordance with the present invention which contained 15% of Wyoming bentonite and 0.5% of calcium lignosulfonate based on weight of dry cement. Duplicate tests of each cement were prepared making a total of six different test-setups. Tensile strength briquettes were poured from the test cement slurries and aged under water at the test site. These cements were then allowed to age in preparation for gun perforation tests. Data on the cement slurries are presented in the following table:

| Test Barrel No. | Type of Cement | Water-to-Cement Ratio, Gals./Sack [1] | Age When Perforated, Days | Tensile Strength— | |
|---|---|---|---|---|---|
| | | | | When Perforated | In 24 Hrs. at 175° F. |
| | | | | Lbs./sq. in. | Lbs./sq. in. |
| I | Slow-Set | 4.5 | 6 | 416 | 400 |
| II | do | 4.5 | 6 | 416 | 400 |
| III | High Early Strength | 6.2 | 7 | 378 | 360 |
| IV | do | 6.2 | 7 | 378 | 360 |
| V | Improved Composition | 10 | 7 | 211 | 176 |
| VI | do | 10 | 7 | 211 | 176 |

[1] 94 pounds.

The gun perforating tests were then made on each of the test-setups when the cement slurries had developed approximately the same strength at atmospheric temperature as they would have developed in 24 hours at 175° F.

Figure 6:
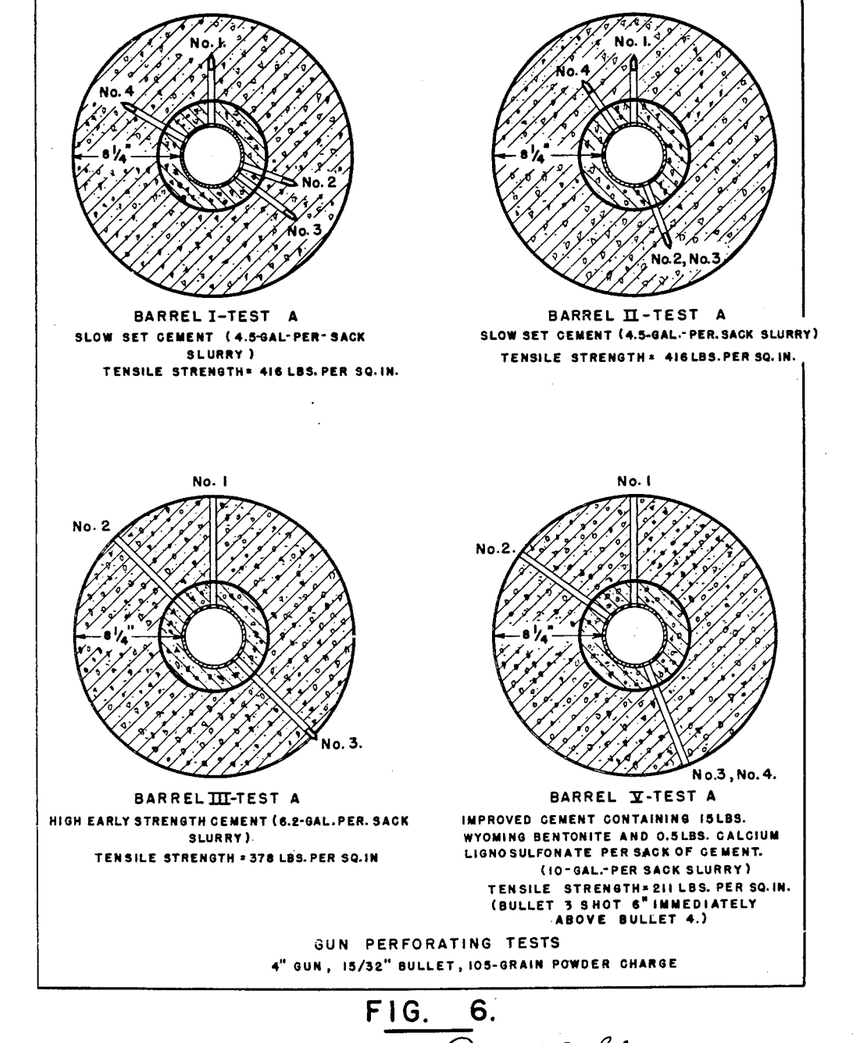
Figure 7:
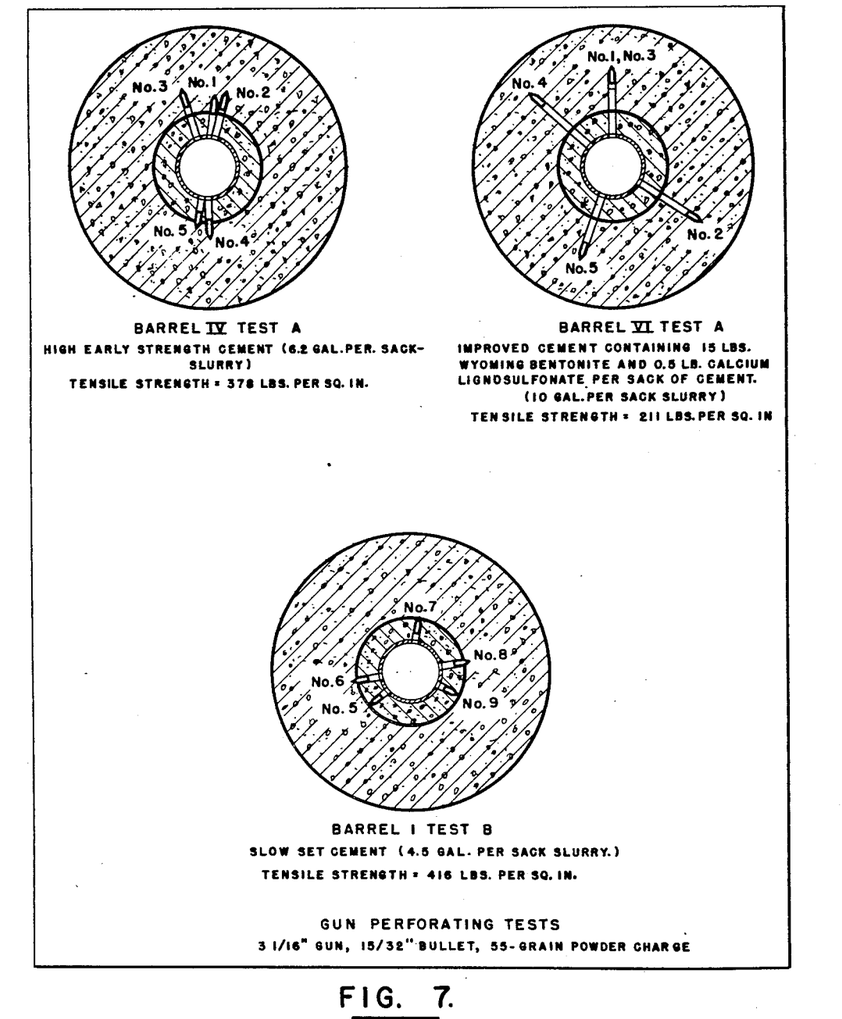

A 4-inch gun with a 1½-inch bullet and 105-grain powder charge was employed to perforate barrels I, II, III, and V. It was noted that the bullets had penetrated completely the test-setup of barrels III and V. Barrels IV and VI were then perforated using a 3 1/16-inch gun with a 1½-inch bullet and a 55-grain powder charge. The above series constitutes test A. Barrel I was reperforated using the 3 1/16-inch gun to obtain comparative penetration data. This reperforation is designated test B. The depths of penetration of the bullets into each cement are shown in Figs. 6 and 7, where each bullet has been indicated by number in each test barrel.

It will be seen that the average penetration obtained with the 4-inch gun and 105-grain powder charge into the slow set cement was 3¾ inches. Two of the three bullets fired into the high early strength cement penetrated the entire test-setup and struck the boiler plate which had been placed around the barrel. The third was found protruding through the 55-gallon capacity steel barrel. The fourth shot failed to fire. On the other hand, all four bullets fired into the cement of the present invention penetrated completely the test-setup and struck the boiler plate with considerable force. With the 3 1/16-inch gun with the 55-grain powder charge, the average penetration into the three cements was as follows:

| | Inches |
|---|---|
| Slow set | 1⅛ |
| High early strength | 1⅝ |
| Cement of present invention | 4 1/16 |

It has been estimated that 31% of the energy from the 4-inch gun, 1½-inch bullet, and 105-grain powder charge, was expended in penetrating the 5½-inch casing and that 71% of the energy from the 3 1/16-inch gun, 1½-inch bullet, 55-grain powder charge was expended in penetrating the 5½-inch casing. Considering the data obtained with the 3 1/16-inch gun, calculations revealed that 42% of the total energy from this gun was consumed in penetrating one inch of slow-set cement, 17.8% of the energy was required to penetrate one inch of the high early strength, and 7.2% of the energy was required to penetrate one inch of the improved cement. Extending these calculations, it may be shown that the 4-inch gun, 1½-inch bullet, 105-grain powder charge provides sufficient energy to penetrate the 5½-inch casing and 22 inches of the improved cement.

In determining the penetration of the bullet, evidence of compaction along the path of the bullet and directly ahead of the bullet was noted in both the slow-set and high early strength cement; no such evidence of compaction was observed in the improved cement. On examining the different types of cement, some cracking was observed in both the slow set and high early strength cements, but very little, if any, cracking was evident in my improved cement.

The sizes of the holes made by the bullets in the three cements tested were then compared. It was noted that the size of the hole increased as the strength of the cement decreased which is highly desirable. With the 4-inch gun with a 105-grain powder charge, the holes in the high early strength cement were about ¾ inch in diameter, while the holes in the improved cement composition were nearly 1 inch in diameter. In all three cements, however, holes of approximately bullet size were obtained using the 3 1/16-inch gun with a 55-grain powder charge. It was observed that the holes were larger than bullet size when the bullets penetrated completely the test-setup whereas when the bullets lodged within the test-setup, the holes were nearly bullet size.

It will be seen from the foregoing results that greater penetrations may be obtained by penetrating casings cemented with the improved cement than with conventional cements. It will also be noted that cements having approximately 200-pound tensile strength in accordance with my invention allow greater penetration than cements having greater tensile strength.

It is to be reiterated that the compositions in accordance with my invention are based on the contributing effects of the various ingredients of my compositions. Thus, the colloidal clay, the salt of the sulfonic acid, such as aromatic and lignin sulfonic acids, contribute in some manner unexplainable at present to give the desired combination of characteristics of non-settling or bleeding, low mechanical strength, and controlled setting time which were unobtainable in the prior art compositions. Thus, the prior art teachings are to the effect that the dispersing agents employed in my improved compositions had little or no effect on the compressive strength of the cement and that the bentonite clay, when the water-to-cement ratio was held constant, increased mechanical strength rather than reduced it. My invention, therefore, is directed to a composition including cement, colloidal clay in a carefully controlled amount, and a water soluble salt of sulfonic acid, such as an aromatic sulfonic acid and lignin sulfonic acid in a carefully controlled amount, and water which may contain other additives such as sodium hexametaphosphate, sodium carbonate, sodium hydroxide and sodium bicarbonate. Only if the first four ingredients are present are the improved results obtained. While it may sometimes be desirable to use the sodium carbonate, sodium bicarbonate, sodium hexametaphosphate, and sodium hydroxide, the use of these materials may be optional; however, the other ingredients are necessary.

The nature and objects of the present invention having been completely described and illustrated, what I wish to claim as new and useful and to secure by Letters Patent is:

1. An improved composition suitable for use in cementing wells which consists of a Portland cement, an amount of a water-soluble salt of lignin sulfonic acid in the range between 0.1 and 1.0% by weight of dry cement, a colloidal clay in an amount in the range between 5% and 35% by weight of dry cement and water in an amount sufficient to provide a pumpable slurry.

2. A composition in accordance with claim 1 in which the colloidal clay is a bentonitic clay.

3. An improved composition suitable for use in cementing wells which consists of an amount of Portland cement in the range between 40 and 70% by weight, a colloidal clay in an amount in the range between 5% and 35% by weight of dry cement, a water soluble salt of lignin sulfonic acid in an amount in the range between 0.1 and 1.0% by weight of dry cement, and the remainder water.

4. A composition in accordance with claim 3 in which the salt of lignin sulfonic acid is a calcium salt and the colloidal clay is a bentonitic clay.

5. An improved composition suitable for use in cementing wells which consists of Portland cement, about 16% by weight of colloidal clay, 0.5% by weight of calcium lignin sulfonate, both based on the dry cement, and approximately 10 gallons of water for each 94 lbs. of cement.

6. A composition in accordance with claim 5 in which the colloidal clay is bentonite.

RICHARD A. SALATHIEL.

REFERENCES CITED

The following references are of record in the file of this patent:

UNITED STATES PATENTS

| Number | Name | Date |
| --- | --- | --- |
| 2,041,086 | O'Brien | May 19, 1936 |
| 2,213,039 | David | Aug. 27, 1940 |
| 2,313,107 | Wertz | Mar. 9, 1943 |